United States Patent
Cho et al.

(10) Patent No.: US 9,423,862 B2
(45) Date of Patent: Aug. 23, 2016

(54) DEVICE AND METHOD FOR CONTROLLING A DISPLAY IN WIRELESS TERMINAL

(75) Inventors: Chihyun Cho, Suwon-si (KR); Hyojae Cho, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 491 days.

(21) Appl. No.: 13/480,996

(22) Filed: May 25, 2012

(65) Prior Publication Data

US 2013/0069888 A1    Mar. 21, 2013

(30) Foreign Application Priority Data

Sep. 21, 2011 (KR) ........................ 10-2011-0095364

(51) Int. Cl.
*G06F 3/041*    (2006.01)
*G06F 1/32*    (2006.01)

(52) U.S. Cl.
CPC .......... *G06F 1/3265* (2013.01); *Y02B 60/1242* (2013.01)

(58) Field of Classification Search
CPC ...... G06F 1/3265; G06F 3/047; G06F 3/046; G06F 3/0418; G06F 2203/041; G06F 3/03547; G06F 3/0412; G06F 3/0414; G06F 3/0416; Y02B 60/1242; H05K 9/0088; H05K 9/0081; H05K 9/0079; H05K 9/0073

USPC .......................................... 345/156, 173–184
See application file for complete search history.

(56) References Cited

U.S. PATENT DOCUMENTS

| 2010/0110310 | A1* | 5/2010 | Ahn et al. ...................... 348/744 |
| 2010/0214278 | A1* | 8/2010 | Miura ........................... 345/212 |
| 2011/0007095 | A1* | 1/2011 | Fujimoto .............. G06F 1/1626 345/650 |
| 2011/0028186 | A1* | 2/2011 | Lee et al. ...................... 455/566 |
| 2011/0107226 | A1* | 5/2011 | Heo .............................. 715/736 |

* cited by examiner

*Primary Examiner* — Kumar Patel
*Assistant Examiner* — Insa Sadio
(74) *Attorney, Agent, or Firm* — Jefferson IP Law, LLP

(57) ABSTRACT

A device and method for controlling a display of a portable terminal are provided. The device includes a display unit including a first display area for displaying an execution screen of an application, and a second display area having at least one display device for displaying at least one touch button, a touch panel for sensing a touch of the first display area and a touch of the second display area, a controller for analyzing a selected application, for displaying an application screen along and an input window of the application selected, and for generating a power control signal for turning off operation of the at least one display device of the second display area, and a power controller for supplying operating power to display devices of the first display area and for turning off operation of the at least one display device of the second display area.

16 Claims, 8 Drawing Sheets

DEVICE AND METHOD FOR CONTROLLING A DISPLAY IN WIRELESS TERMINAL

PRIORITY

This application claims the benefit under 35 U.S.C. §119(a) of a Korean patent application filed on Sep. 21, 2011 in the Korean Intellectual Property Office and assigned Serial No. 10-2011-0095364, the entire disclosure of which is hereby incorporated by reference.

BACKGROUND OF THE INVENTION

1. Field of the Invention

The present invention relates to a device and method for controlling a display in a portable terminal. More particularly, the present invention relates to a device and method for controlling a display in a portable terminal having a touch panel.

2. Description of the Related Art

A portable terminal including a battery may also include a touch screen which has an integrated input and display functions by having a touch panel. Furthermore, the portable terminal may include button keys, such as a home key for moving to a home screen, an up/down key for controlling volume, a power key, a menu key, a cancel key, and other similar keys, buttons or input units on an external side of the portable terminal. Part of the above keys may be implemented by a touch button, and the touch button may be positioned at a variety of positions (e.g., the bottom of the main screen) which are different from the main screen (e.g., the display unit consisting of display devices), and the touch button may be displayed using Light Emitting Diodes (LEDs). The touch button is a key for controlling overall operation of the portable terminal, and generates an input for cancelling a currently operated application or returning back to a main menu.

Furthermore, the portable terminal may execute various applications, and input and display methods for controlling the execution of an application may vary according to the application. For example, when executing an application for transmitting a message, the portable terminal may display an input keypad on the display unit, may sense a position touched on the displayed input keypad, and may write a message via inputs to the displayed input keypad. In a case of executing a camera application, a key array for photographing is displayed on the display unit, and a key on a touched position of the key array is sensed and a camera function may be executed.

According to the related-art, a display method of a touch button applied to the portable terminal may maintain lighting of the touch button for a time period which has been set by a user or a time period which has been set at the time of development of the portable terminal However, in the case of the touch button, the touch button may not be used according to the currently executed application. That is, for example, in the case of a message writing mode, the input window is activated and the keypad is displayed, and in such a case, the user performs an input function using a keypad displayed on the main screen and the touch button is generally not used. Hence, when executing an application where an input window is activated, even if a touch button is not displayed, a user may not feel inconvenience.

However, in the related-art method, an LED lighting time of the touch button may be increased or a brightness may also be increased at any time without considering an improvement in electric current consumption according to a manufacturer's or a user's preference, and even in the case where there is no intention of using a touch button, when a screen is touched, the lighting of the LED may be maintained for a certain time period, thereby generating unnecessary current consumption and decreasing of battery charge for the portable terminal

SUMMARY OF THE INVENTION

Aspects of the present invention are to address the above-mentioned problems and/or disadvantages and to provide at least the advantages described below. Accordingly, an aspect of the present invention is to provide a method for reducing electric current consumption by controlling on/off conditions of a touch button Light Emitting Diode (LED) used in a portable terminal Another aspect of the present invention is to provide a method for controlling to not turn on the LED of a touch button when executing an application where an input window is activated according to the currently executed application of the portable terminal.

In accordance with an aspect of the present invention, a device for controlling a display of a portable terminal is provided. The device includes a display unit including a first display area for displaying an execution screen of an application, and a second display area having at least one display device for displaying at least one touch button, a touch panel for sensing a touch of the first display area and a touch of the second display area, a controller for analyzing an application selected through the touch panel, for displaying an application screen along with an input window of the application screen corresponding to an application selected in the first display area of the display unit if the selected application is an application having an input window that is activated, and for generating a power control signal for turning off operation of display devices of the second display area, and a power controller fir supplying operating power to display devices of the first display area and for turning off operation of the at least one display device of the second display area when the portable terminal is executing the application having the input window is activated using a power control signal of the controller.

In accordance with another aspect of the present invention, a method for controlling a display of a portable terminal is provided. The method includes determining whether an application is selected through a touch panel of the portable terminal, the portable terminal including a display unit having a first display area that displays an execution screen of the selected application and a second display area including a display device for displaying at least one touch button, wherein the touch panel senses a touch of the first display area and a touch of the second display area, determining whether the selected application has an input window that is activated upon a selecting of the application, displaying an application screen along with an input window of the selected application in the first display area of the display unit, turning off a display of the touch button by blocking a supply of operating power for the display device of the second display area, and executing the selected application if the selected application has the input window that is activated.

In accordance with another aspect of the present invention, a method for controlling a display of a portable terminal further is provided. The method includes displaying a lock screen cancellation screen in the first display area when the portable terminal is in a lock screen mode, turning off a display of the touch buttons of the second display area when a sleep mode of the portable terminal is changed to an operation mode of the portable terminal, and displaying a menu screen and determining the selected application upon a cancelling of the lock screen mode.

In accordance with another aspect of the present invention, a method for controlling a display of a portable terminal further is provided. The method includes displaying a screen of the selected application in the first display area of the display unit, displaying touch buttons by supplying operating power to the display devices of the second display area and executing the selected application if the selected application does not have an input window that is activated.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
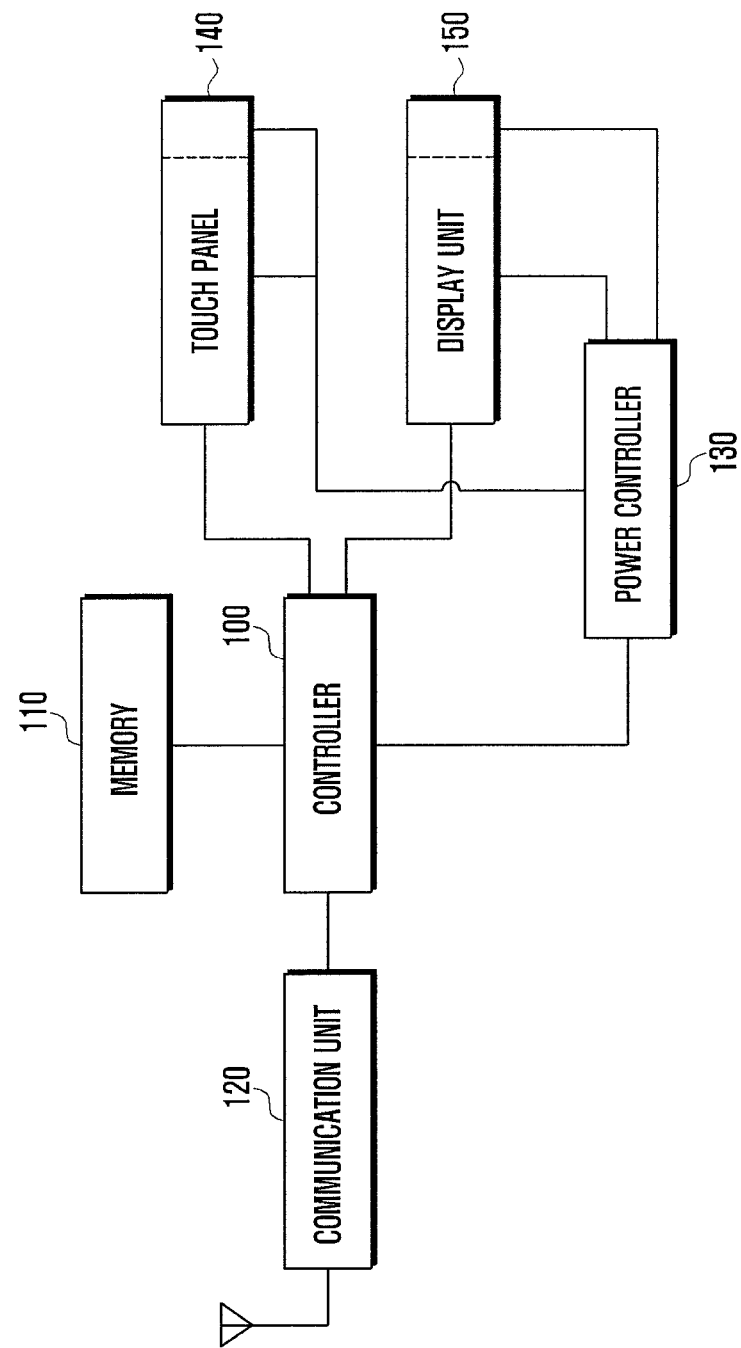
FIG. 1 illustrates a portable terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present exemplary embodiments relate to a device and method for saving power in a portable terminal including a touch screen that may have a display unit and a touch panel, wherein the display unit may be divided into a first display area that displays a main screen and a second display area that displays a touch button. Further, the first display area may be a Liquid Crystal Display (LCD), an Organic Light Emitting Diode (OLED), or any other suitable display apparatus, and the second area may be a Light Emitting Diode (LED). Hereinafter, the recitation of Light Emitting Diode or LED may refer to one LED or a plurality of LEDs. In the present exemplary embodiments, a touch button may be a button operated and/or used while an application is being executed. Furthermore, a touch panel may include a first touch panel for sensing a touch of the first display area and a second touch panel for sensing a touch of the second display area.

In the present exemplary embodiments described below, it is assumed that the touch button is at least one of a menu button and a cancel button. However, the present invention is not limited thereto, and the touch button may be any one of buttons of different functions. Furthermore, in the exemplary embodiments discussed below, a touch button refers to a fixed button, and a soft key refers to input keys which are displayed in the display unit according to the application. That is, the touch button is a button that is operated regardless of an application executed in the portable terminal, and the soft key is a key that performs an input function in a corresponding application. Also, in the exemplary embodiments described below, an application may be a function, a program, an operation, or any other similar entity or process of a portable terminal For example, each function of a voice call mode, a video call mode, a data communication mode, a message mode such as a Short Messaging Service (SMS), an Enhanced Messaging Service (EMS) and a Multimedia Messaging Service (MMS), a camera mode, a TeleVision (TV) mode, a multimedia mode, and other similar modes of operation of the portable terminal may be an application. Furthermore, the touch button may comprise at least one of a menu button, a home button, a cancel button, a search button, and any other suitable or similar button.

According to the exemplary embodiments of the present invention, as discussed below, power consumption of a portable terminal is reduced by selectively controlling an on/off state of the LED of the touch button according to the application executed in the portable terminal in a portable terminal having an LED which displays a touch button area. There are a variety of kinds of touch buttons. At this time, the portable terminal may generate a condition that does not use a touch button, such as an application in which user does not often use a touch key input, according to the application. In such a case, the portable terminal may turn on the corresponding LED so as to display the touch button continually or for a preset time period, and thus unnecessary power consumption may occur. Hence, in a case where an application is executed in which a user may not often use an input of a touch button, the LED of the touch button may be turned off In a portable terminal which adopts an Operating System (OS), such as Apple Computer's iOS or Google's Android, of a touch input type, a Software (S/W) keypad may be used instead of a Hardware (H/W) keypad. The S/W keypad may be overlaid, i.e., displayed, on the screen in a first display area in a case where the user tries to input text into a text field, and in such a case, the user usually inputs a sentence or a string of characters, rather than just one letter. When inputting the sentence or the string of characters, the user continually touches the S/W keypad displayed on the screen in the first display area, and in such a case, whenever the screen keypad is touched, the LED of the touch button of the second display area may be unnecessarily turned on for a certain time period. Accordingly, in an exemplary embodiment of the present invention, if the S/W keypad is overlaid on the screen such that there is a low possibility that the user uses a touch button, the touch button LED is controlled so as to be not turned on.

Furthermore, in an exemplary embodiment of the present invention, an application which does not operate the touch button LED of the second display area may be an application that activates an input window and a lock mode (i.e., a touch screen lock mode). Additionally, the application, which activates the input window, may be an application for a voice call and/or video call, a data communication application, a message application (SMS, EMS, MMS, etc.), a multimedia application (a camera operation mode, a TV mode and a video mode, etc.), and a game application, or any other similar application.

FIG. 1 illustrates a portable terminal according to an exemplary embodiment of the present invention.

Referring to FIG. 1, a communication unit 120 frequency-down-converts a received Radio Frequency (RF) signal into a baseband signal, and frequency-up-converts a transmitted signal into a RF band signal. The communication unit 120 may include a modem including a modulation unit that modulates a transmitted signal, and a demodulation unit that demodulates a received signal converted into baseband. Furthermore, the modem may be for a variety of wireless communication protocols or systems, such as $3^{rd}$ Generation Partnership Project (3GPP) Long Term Evolution (LTE), Code Division Multiple Access (CDMA), Global System for Mobile Communications (GSM), Wideband CDMA (WCDMA), Wireless-Fidelity (Wi-Fi), Wireless Broadband (WiBro), and any other suitable communication protocol or system.

A memory 110 may include a program memory for storing an operation program of a portable terminal and a power control program, or any other suitable program, and a data memory for storing data that used for executing a program and data that is generated during execution of a program.

A display unit 150 displays operations and a status of the portable terminal, and may be an LED, an OLED, or any other suitable display. Furthermore, the display unit 150 may include a first display area and a second display area, although not shown. Additionally, the portable terminal may include a touch panel 140, a controller 100, and a power controller 130.

Figure 2:
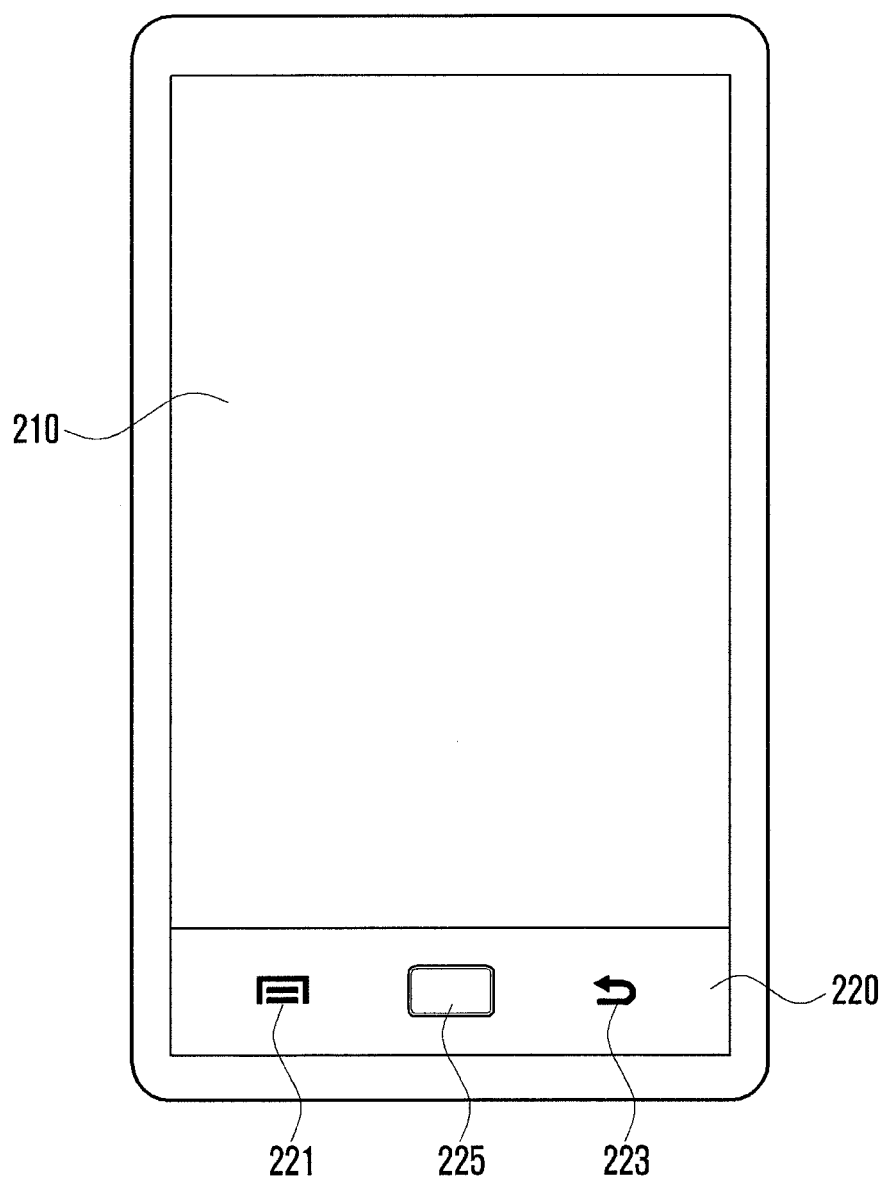
FIG. 2 illustrates a display unit of a portable terminal according to an exemplary embodiment of the present invention.

FIG. 2 illustrates a display unit of a portable terminal according to an exemplary embodiment of the present invention.

Referring to FIG. 2, the display unit 150 includes a first display area 210 that displays an operation and status screen of a corresponding application when executing an application and a second display area 220 that displays a touch button. The touch button of the second area 220 is an area allocated to display touch button regardless of the currently executed application, wherein the touch button is fixedly allocated to be displayed in the second area 220. According to an exemplary embodiment of the present invention, it is assumed that the touch button includes a menu button 221, a home button 225 and a cancel button 223. However, the present invention is not limited thereto, and other suitable buttons may be included in the second area 220. Additionally, a size of the touch button may be increased or decreased according to an application, a user, or other settings, and may also be substituted with another touch button. Furthermore, the home button 225 may be a structural button, i.e., a physical button included in the physical structure of the portable terminal. The second display area 220, where the touch button is disposed, may be an LED display device.

Returning to FIG. 1, the touch panel 140 may be an input device including a touch panel of a capacitance type, or any other suitable type for receiving a touch input. The touch panel 140 may include a first touch area corresponding to the first display area 210 (see FIG. 2) and a second touch area corresponding to the second display area 220 (see FIG. 2).

The controller 100 controls overall operations of the portable terminal and generates a power control signal for turning off operation of the LED that displays a touch button in the second display area 220 during a lock screen mode or during execution of an application having an input window that is activated. Additionally, the power controller 130 controls a supply of operating power for the portable terminal under the control of the controller 100, and particularly controls the power supply to turn off the LED of the second display area 220 of the display unit 150. At this time, in a case of executing an application having the input window activated, the power controller 130 controls the touch button to be operated by supplying power to the first touch area and the second touch area of the touch panel 140.

In a case where the LED of the second display area 220, which displays the touch button, is not turned on (i.e., the portable terminal executes the application where the user does not use a touch button input), even if the corresponding application is executed, the LED of the touch button is not operated. That is, the portable terminal supplies power to operate a corresponding LED for a preset time period in order to display the touch button of the second display area 220 when an application is changed or a screen of the first display area 210 of the display unit 150 is changed.

However, in the case of an application having an input window that is activated, an input function is generally executed through an input window activated in the first display area 210, and in such a case, the touch button displayed in the second display area 220 may not be used. For example, when executing a message writing application, a 3*4 keypad or QWERTY keypad is displayed in the first display area 210. In such a case, the user executes an input function through the displayed keypad, and may not use the touch button of the second display area 220. Hence, in the case of executing a message writing application, the controller 100 controls the power controller 130 so as to not operate the LED of the second display area 220 of the display unit 150. Therefore, at a time point when the application is executed or when the first display area 210 is continually touched for a letter input, the LEDs corresponding to the touch buttons of the second display area 220 are in an off state, and thus power consumption of the portable terminal may be reduced.

Figure 3:
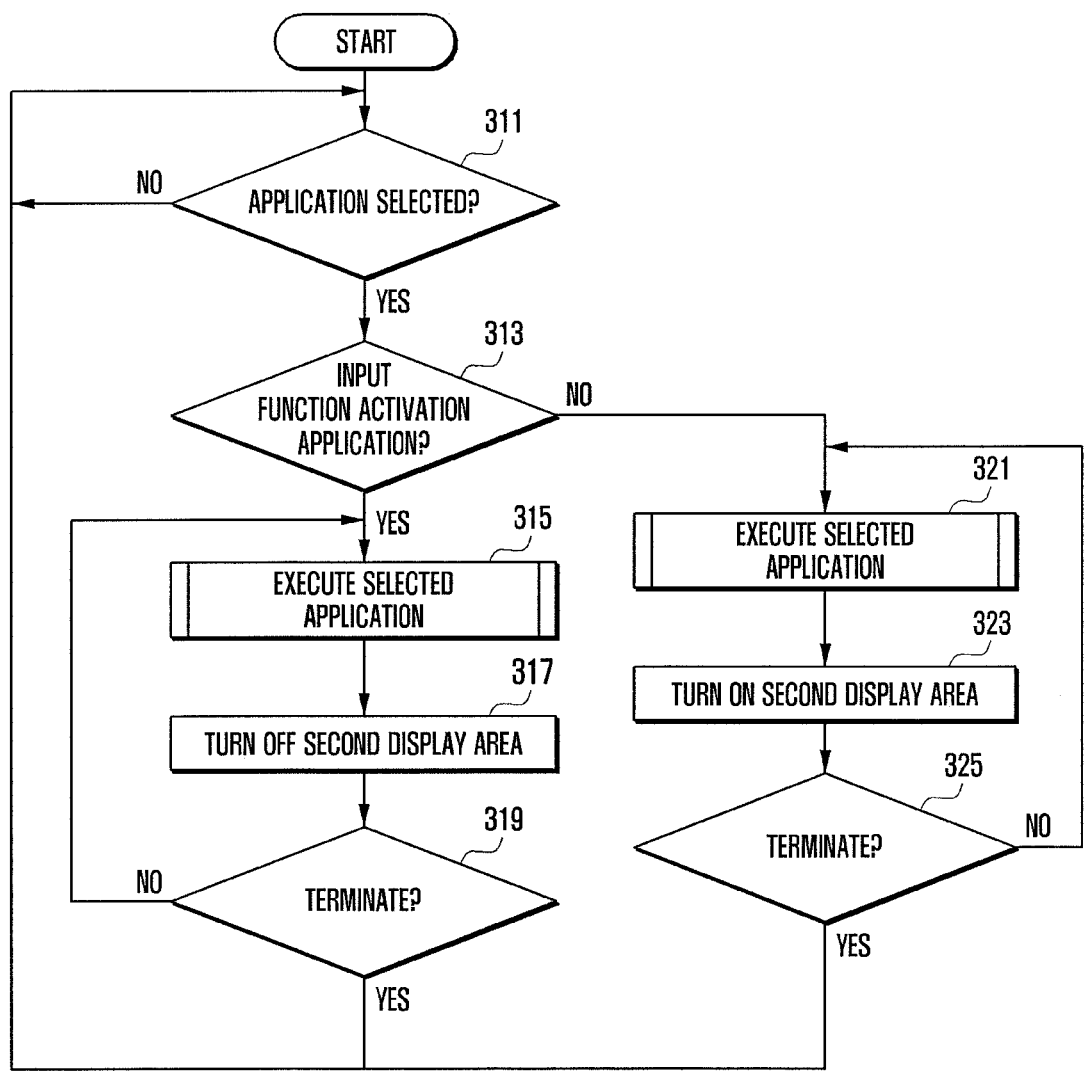
FIG. 3 is a flowchart illustrating a procedure for controlling a display operation according to a type of an application executed in a portable terminal according to an exemplary embodiment of the present invention.

FIG. 3 is a flowchart illustrating a procedure for controlling a display operation according to a type of an application executed in a portable terminal according to an exemplary embodiment of the present invention.

Referring to FIG. 3, it is assumed that an area of the display unit 150 where a touch button is positioned is the second display area 220. In such a case, the first display area 210 of the display unit 150 may be implemented as an LCD or an OLED, and the second display area 220 may be an LED corresponding to the touch buttons as described above.

In step 311, if user selects a certain application via the touch panel 140, then the controller 100 senses the selection. Next, in step 313, the controller 100 analyzes the selected application and determines whether the application activates an input function. With respect to the present exemplary embodiment, applications may be divided into applications having an input window that is activated and applications having an input window that is not activated. The applications having the input window that is activated may be voice call and/or video call applications that activate a keypad, an input window, for dialing a phone number, communication applications for uploading/downloading letters and data, letter writing and transmission applications for writing and transmitting letters such as an e-mail, SMS and messenger, multimedia applications such as camera operation, TV watching, and video replay, game applications, or any variety of applications that are executable on a portable terminal In the case of the applications having the input window that is activated, when selecting an application, a S/W keypad may be provided as an interface instead of a H/W keypad in the first display area 210. The S/W keypad is displayed in the first display area 210 so that the user may execute or control the selected application using the S/W keypad. For example, in the case of an application for writing a document or a sentence, the user may input text in a text field displayed in the first display area 210 using the S/W keypad that is also displayed in the first display area 210. In a case where the user is inputting a sentence, the S/W keypad of the first display area 210 is continually touched or touched in a rapid sequence of touches, and in such a case, the portable terminal may continually operate a touch button display device of the second display area 220 whenever touching of the S/W keypad occurs, thus, resulting in unnecessary power consumption of the portable terminal Hence, in such a case, the display device of the second display area 220 may not be operated in order to consume less power than in the case described above.

Accordingly, in a case where an application having an input function (i.e., an input window) that is activated is selected, the controller 100 senses the selection in step 311, then determines that the selected application has activated an input function in step 313, and then, in step 315, executes the selected application and displays an input window of a corresponding application in the first display area 210 of the display unit 150. Next, in step 317, the controller 100 controls the power controller 130 to turn off the LED operation of the second display area 220, and controls the touch buttons 221 to 225 so as not to be displayed when executing the selected application having an input window is that activated. If an application is executed as described above, the controller 110 controls the power controller 130 to supply normal operating power to the first display area 210, and, concurrently, controls the power controller 130 to not supply operating power to the second display area 220. Hence, an operation screen of an application being executed and/or an input window of the application are displayed in the first display area 210, and a display of a touch button is stopped. However, the first touch area and the second touch area of the touch panel 140 are in the state of being supplied operating power, and thus if a touch button is touched although the LED of the second display area 220 is turned off, the controller 110 may sense the touch. Hence, if a touch occurs in the state where the display device, such as the LED, of the second display area 220 is turned off, the controller 110 may perform the function of a corresponding touch button.

In a case where an application is executed having an input window that is activated, the user may control execution of another application selected through the input window displayed in the first display area 210, and at this time, even if a touch input is generated in the first display area 210, the controller 100 does not operate the LED, i.e., the display device, of the second display area 220. As such, when an application having an input window that is activated is executed, even if an input touch occurs, display devices for unnecessarily displaying touch buttons are turned off, thereby reducing power consumption. Furthermore, in step 319, if a termination request for the application is generated, the controller 100 senses the request, terminates the application, and then returns to step 311. Here, the termination of the application at step 319 may be a time point when the corresponding application is terminated or a time point when the display of the input window is terminated or turned off, such as a case where an auto-off function is activated after a predetermined amount of time has elapsed.

However, in a case where it is determined that an application is selected not having an input window that is activated at step 313, then the controller 100 executes a corresponding application in step 321, and controls the power controller 130 to supply operating power to the second display area 220 in step 323. Then operating power is supplied to both the first display area 210 and the second display area 220, and thus the touch buttons are displayed. Furthermore, if the application is terminated, the controller 100 senses the termination in step 325, terminates the application, and then returns back to step 311.

The portable terminal may also perform a lock screen mode that prevents an input so as to restrict access to an unauthorized user. Here, the lock screen mode may have a method of cancelling lock mode of the portable terminal by touching and dragging a touch according to a certain pattern on the screen, a method of cancelling the lock mode of the portable terminal by touching and dragging a touch in a certain direction, or a method of setting a password or security input, such as a thumbprint or a face recognition. The portable terminal may also perform a locking function for a certain application and a cancelling of the locking function when inputting a password or a security input at the time of executing the application.

Figure 4:
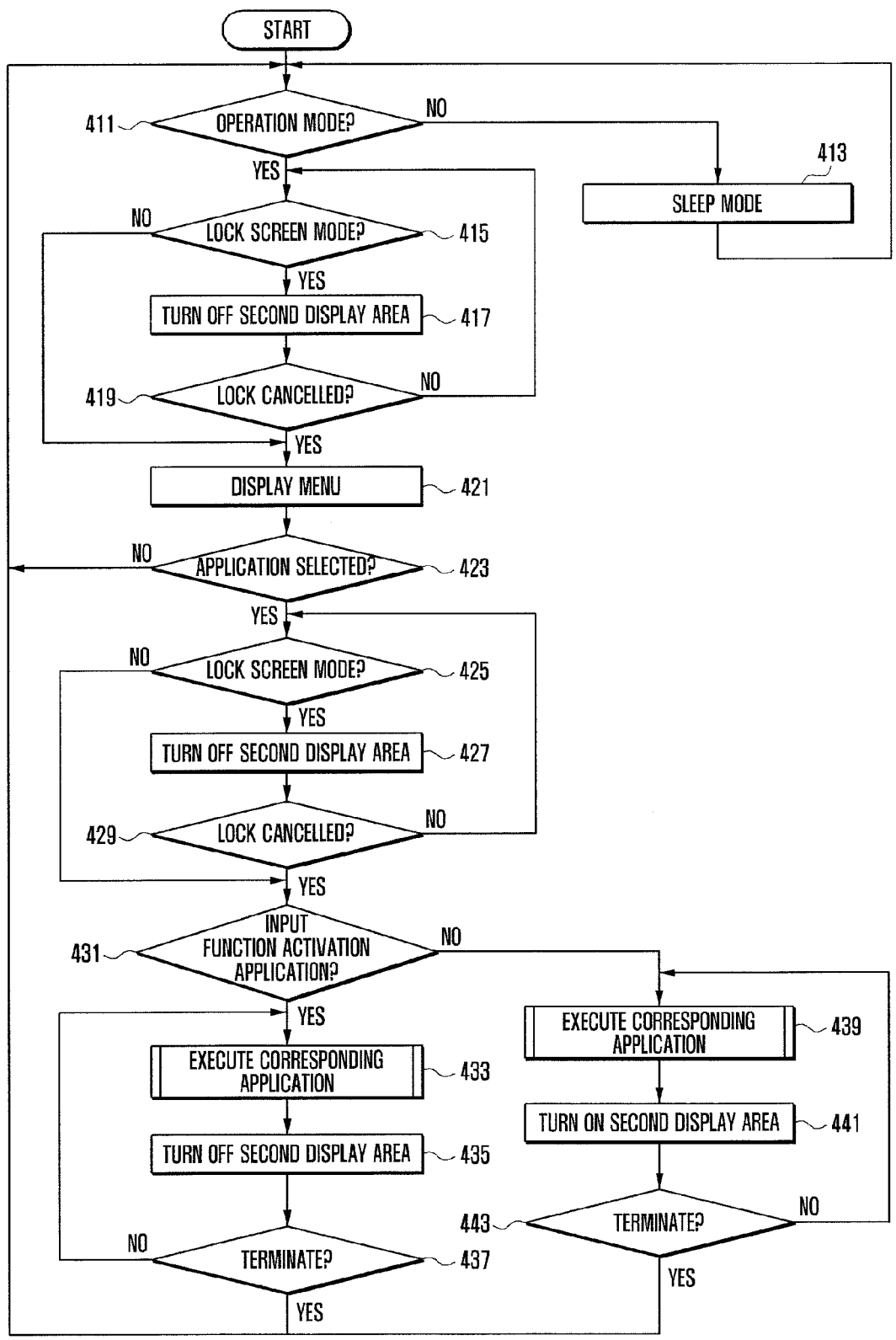
FIG. 4 is a flowchart illustrating a procedure for controlling a display unit according to an application selected according to an exemplary embodiment of the present invention.

FIG. 4 is a flowchart illustrating a procedure for controlling a display unit according to an application selected according to an exemplary embodiment of the present invention. FIGS. 5A to 5D illustrate an example of controlling a display of touch buttons of a second display area according to an exemplary embodiment of the present invention.

Referring to FIG. 4, the controlling of the display unit may be for a portable terminal having a lock screen mode. Referring to FIGS. 5A to 5D, FIG. 5A illustrates a screen example of a lock screen mode when a slip mode is changed to an operation mode, FIG. 5B illustrates a screen example displayed when the slip mode is changed to the operation mode and/or the lock screen mode enters a preset application, FIG. 5C illustrates a screen example of an application that displays a QWERTY keypad, and FIG. 5D illustrates a screen example of an application that displays a 3*4 keypad.

Referring to FIG. 4, the controller 100 determines whether the portable terminal is in an operation mode in step 411. At this time, if the portable terminal is not in an operation mode, the controller 100 enters a sleep mode in step 413, wherein the controller 100 controls the power controller 130 to turn off display devices of the first display area 210 and the second display area 220. However, if the portable terminal is in the operation mode (e.g., in a case where a menu button, a home button, or another similar button is selected at an idle state or sleep mode), then the controller 100 determines whether a current mode is a lock screen mode in step 415.

In a case where a sleep mode is changed to an operation mode, the controller 100 determines that the lock screen mode is active, and may display an input window for cancelling the lock screen mode in the first display area 210. At this time, the controller 100 controls the touch buttons so that they are not displayed by turning off the second display area 220 of the display unit 150 in step 417. That is, since an input to a touch button produces no actions or results when the portable terminal is in the lock screen mode, the touch button is not displayed because the display of the second display area 220 is turned off. Thereafter, if an input for cancelling the lock screen mode occurs, the controller 100 senses the input in step 419 and displays a menu in step 421. However, if it is determined, at step 415, that the mode is not the lock screen mode, then the process moves to step 421.

Figure 5A:
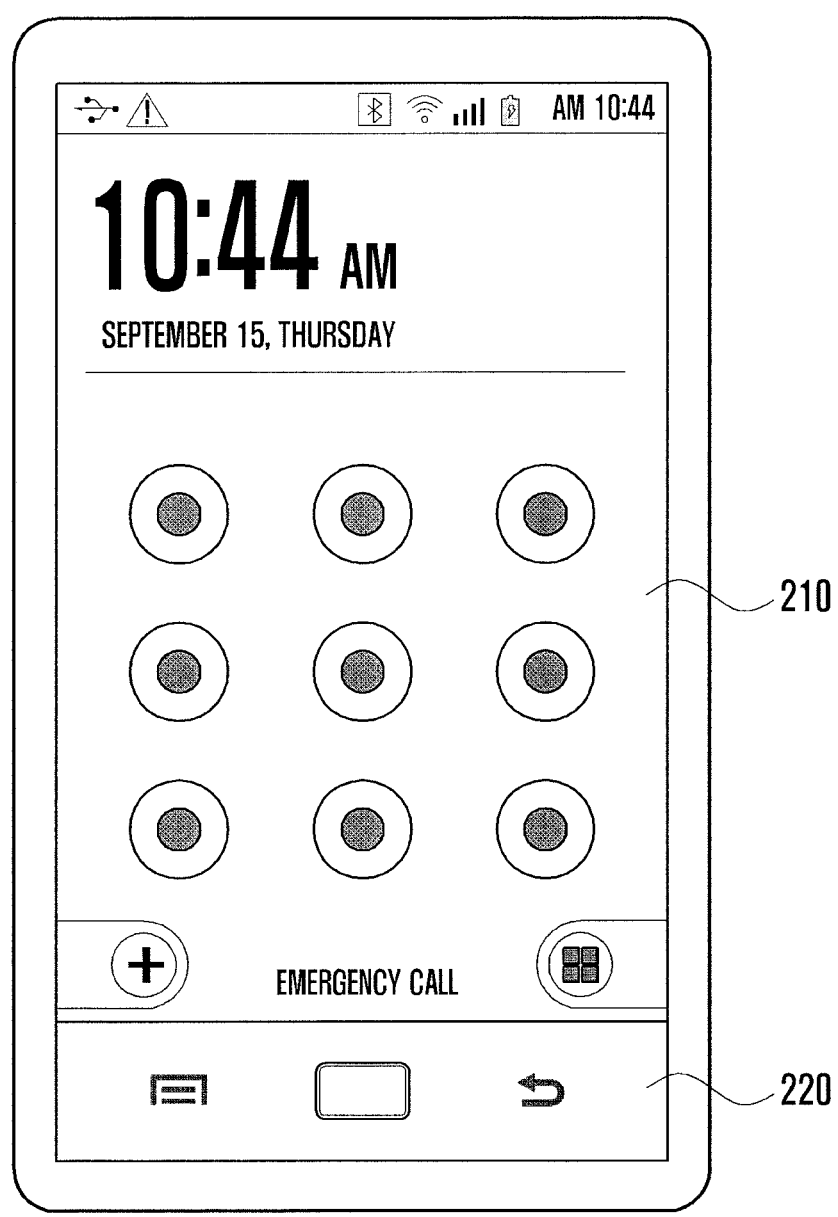
FIGS. 5A to 5D illustrate an example of controlling a display of touch buttons of a second display area according to an exemplary embodiment of the present invention.
Figure 5B:
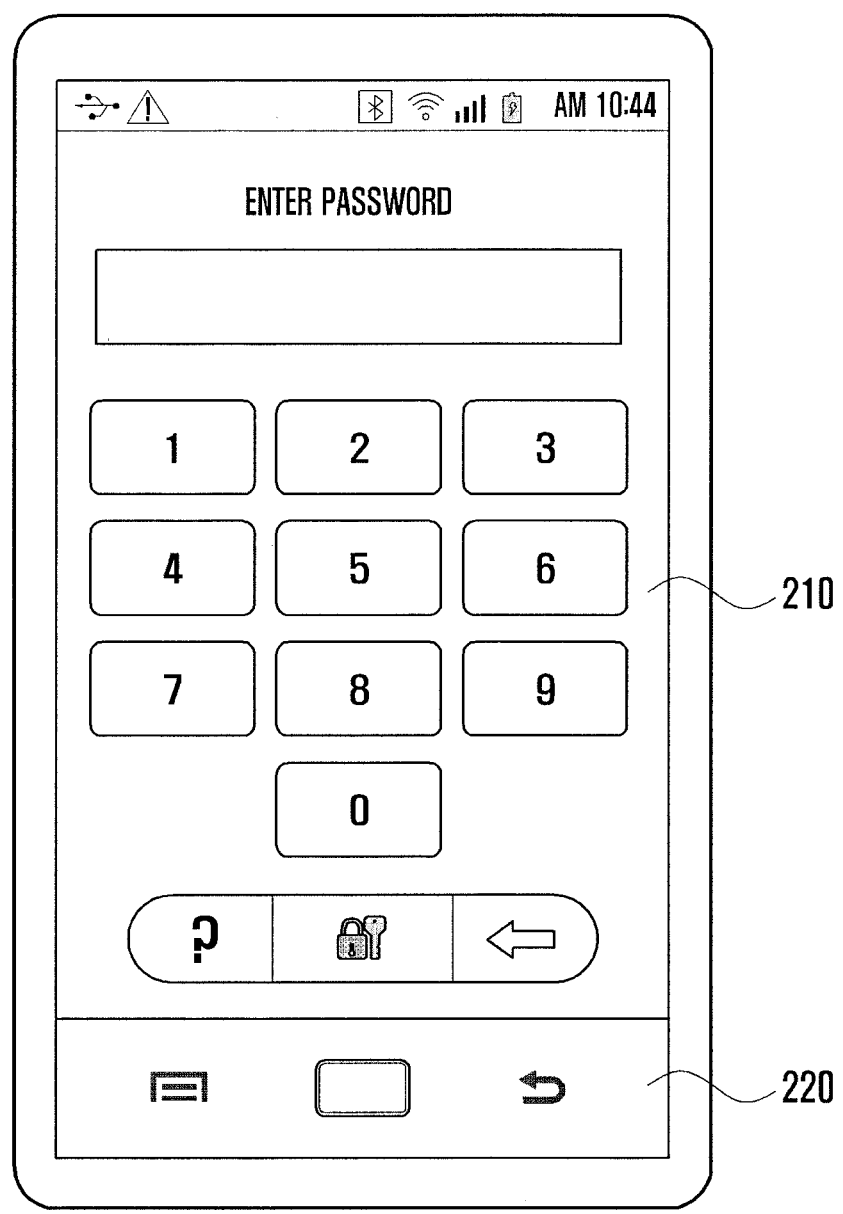
Figure 5C:
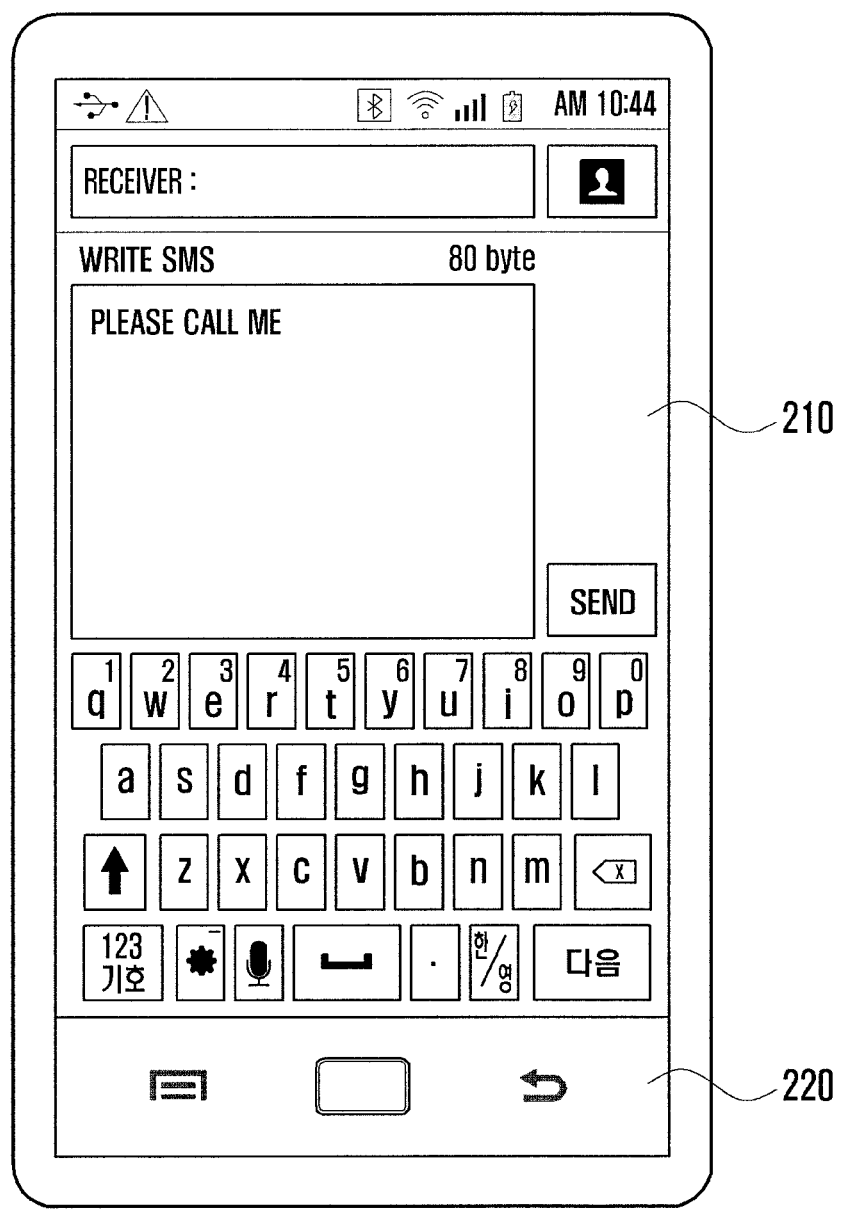
Figure 5D:
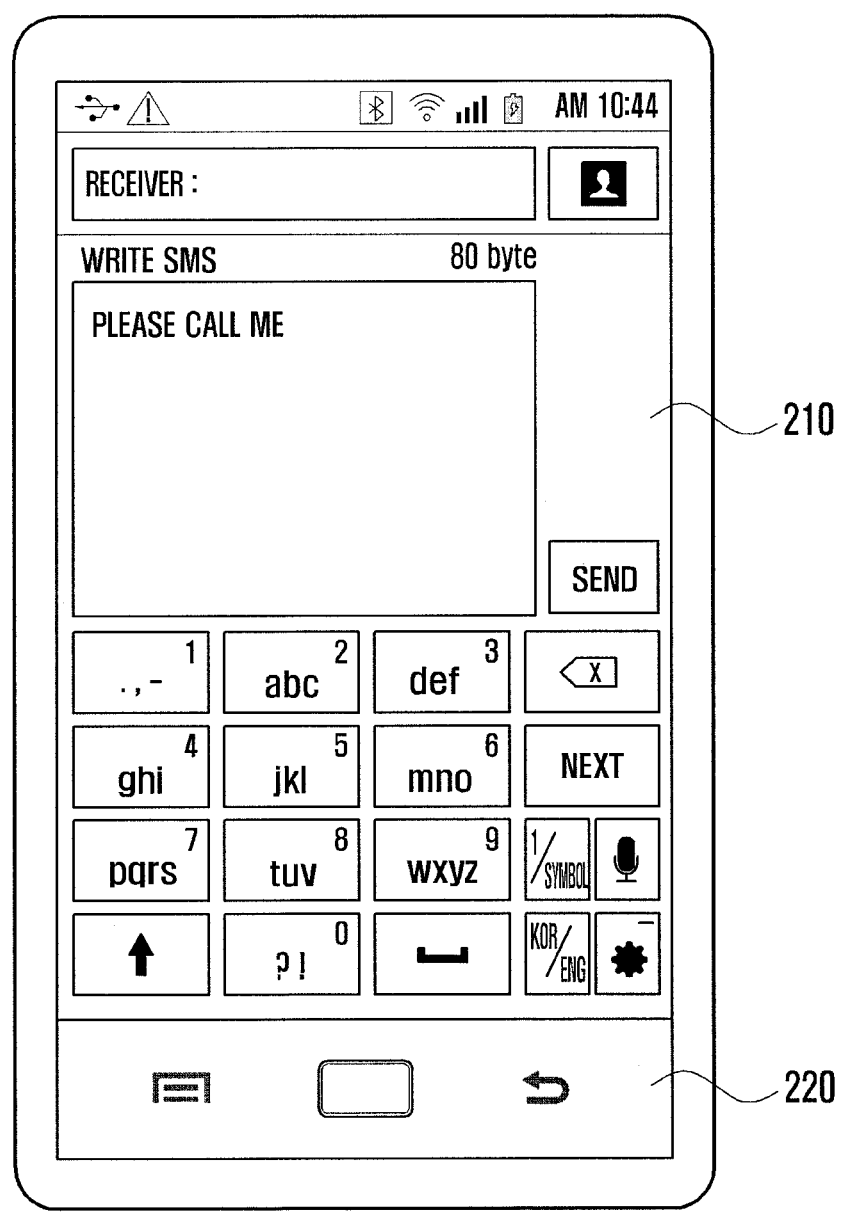

That is, when the controller 100 transitions from the sleep mode to an operation mode, the controller 100 may display a pattern input screen for cancelling lock screen mode in the first screen area 210 of the display unit 150, as shown in FIG. 5A, and may turn off the display device so that the touch button of the second screen area 220 is not displayed. Alternatively, as illustrated in FIG. 5B, the controller 100 may display a number keypad screen for inputting a password to cancel the lock screen mode in the first screen area 210 of the display unit 150, and may turn off the display device so that the touch button of the second screen area 220 is not displayed. Thereafter, if the lock screen mode is cancelled, the controller 100 may display the menu of the portable terminal in the first screen area 210, and at this time, the controller 100 may control the display device of the second display area 220 so that it displays the touch button for a preset time period.

Next, if the user selects a certain application when a menu is displayed in step 421, then the controller 100 senses the selection in step 423, and determines whether the selected application is an application which activates the lock screen mode. Here, the application which activates the lock screen mode may be an application that also activates a password input field for privacy protection. At this time, if the application has activated the lock screen mode with the password input field, as shown in FIG. 5B, the controller 100 displays a screen for cancelling lock screen mode in the first display area 210 of the display unit 150 and turns off display devices of the touch buttons of the second display area 220 in step 427. Thereafter, if the user cancels the lock screen mode, then in step 431, the controller 100 determines whether the selected application is an application where an input window is activated. Furthermore, if, in step 425, the controller 100 determines that the application does not activate the lock screen mode, then the controller 100 determines whether the selected application is an application where an input window is activated in step 431.

If the selected application is an application where an input window is activated, as determined in step 431, then the controller 100 executes a corresponding application in step 433, and then turns off display devices of touch buttons of the second display area 220 in step 435. Furthermore, in the above state, the controller 100 executes a corresponding application according to data inputted through the input window or user's command, and at this time, the controller 100 controls display devices of touch buttons of the second display area 220 to be in an off state.

The above described state for the portable terminal is maintained until the execution of the application is terminated, wherein, in step 437, the controller 100 senses the termination of the application and returns back to step 411. Hence, if the application is an application where an input window is activated, even if a touch input to the first area 210 occurs during execution of the application, the touch button of the second display area 220 is not displayed, such that power consumption of the portable terminal is reduced.

For example, if an SMS application is selected to be executed on the portable terminal, a QWERTY keypad or 3*4 keypad and a message window are displayed in the first screen area 210 of the display unit 150, as shown in FIG. 5C or 5D. In such a case, the user inputs letters through a keypad, and the inputted letters are displayed in the message window. At this time, even if user touches the keypad, the controller 100 does not operate display devices of the second display area 220, as shown in FIG. 5C or 5D, and thus the touch button is not displayed when executing the SMS application, or any similar application where an input window is activated regardless of user's touch.

However, if it is determined, in step 431, that the selected application is not an application where an input window is activated, then the controller 100 executes the corresponding application in step 439, and turns on display devices of the second display area 220 in step 441. At this time, the operation of the second display devices is performed for a preset time period, and thus the touch buttons of the second display area 220 are displayed for a preset time period. At this time, in the case where the application does not activate an input window, if a touch occurs at an arbitrary position of the first area 210 during execution of the application at step 439, then the controller 100 operates display devices of the second display area 220 so that the touch button may be displayed for a preset time period.

The above operating state of the portable terminal is maintained until execution of the application is terminated, which is sensed by the controller in step 443, and the process then returns back to step 411.

According to the exemplary embodiments discussed above, in the case where use of a touch button is unnecessary according to an application, (i.e., an application where a user does not frequently use a touch key input), a display device for displaying a touch button is turned off, and more specifically, an LED used to illuminate the touch button is not turned on, thereby reducing power consumption by the portable terminal That is, in the case of a portable terminal using a touch screen, an S/W keypad may be overlaid on a screen of the portable terminal according to an application, and the user inputs a touch or gesture on the text field, or inputs a command for controlling an operation of an application executed through the S/W keypad. At this time, the S/W keypad displayed on the screen may be continually touched or touched in a rapid sequence of touches, and in such a case, when touching the S/W keypad, the LED of the touch button is turned off. As such, when writing an SMS or an MMS, or when executing an application that allows for a long text input, electric current consumption, i.e., battery or power consumption, by LED lighting may be reduced. For example, the electric current consumption of an LED Integrated Circuit (IC) of the portable terminal may be 12 mA, and thus, when performing an application where an input window is activated, consumption of power source can be saved by having the LED IC turned off so as to not consume the 12 mA.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A device for controlling a display of a portable terminal, the device comprising:
   a touch panel;
   a first display device configured to display an execution screen of an application;
   at least one second display device configured to display a touch button, the touch button being allocated fixedly and operated regardless of the application executed;
   a controller configured to:
      control the first display device to display the execution screen of the application, and
      generate a power control signal for turning off the second display device such that the touch button is no longer displayed, if the executed application includes an input window; and
   a power controller configured to:
      supply power to the first display device, and
      turn off power to the second display device in response to the power control signal,
   wherein the second display device is not superimposed on the first display device.

2. The device of claim 1,
   wherein the first display device includes at least one of a Liquid Crystal Display (LCD) and an Organic Light Emitting Diode (OLED), and the at least one second display device includes Light Emitting Diodes (LEDs), and
   wherein a number of the LEDs corresponds to a number of the touch button.

3. The device of claim 2,
   wherein the executed application having the input window is an application having a letter keypad that is displayed by the first display device, and
   wherein the controller is further configured to generate a power control signal for turning off the at least one second display device regardless of a touch event on the first display device displaying the execution screen of the executed application including the input window activated.

4. The device of claim 3, wherein the touch button of the at least one second display device includes at least one of a menu button and a cancel button.

5. The device of claim 4,
   wherein the controller is further configured to:
      control the power controller so as to continually supply power to the touch panel, and
      execute a function corresponding to a touched touch button upon sensing a touch event on the at least one second display device while the executed application including the input window is executed.

6. A method for controlling a display of a portable terminal, the method comprising:
   displaying, by a first display device, an execution screen of an application;
   displaying, by at least one second display device, a touch button, the touch button being allocated fixedly and operated regardless of the application executed;
   generating, by a controller, a power control signal for turning off the second display device if the executed application includes an input window; and
   turning off, by a power controller, power to the second display device such that the touch button is no longer displayed in response to the power control signal,
   wherein the second display device is not superimposed on the first display device.

7. The method of claim 6,
   wherein the executed application including the input window is an application having a letter keypad that is displayed in the first display device, and
   wherein the generating of the power control signal comprises generating the power control signal regardless of a touch event on the first display device displaying the execution screen of the executed application including the input window activated.

8. The method of claim 7, wherein the first display device includes at least one of a Liquid Crystal Display (LCD) or an Organic Light Emitting Diode (OLED), and the at least one second display device includes Light Emitting Diodes (LEDs),
   wherein a number of the LEDs corresponds to a number of the touch button, and
   wherein the turning off power to the at least one second display device turns off operation of the LEDs of the at least one second display device.

9. The method of claim 8, wherein the touch button of the at least one second display device includes at least one of a menu button and a cancel button.

10. The method of claim 9, further comprising:
    supplying the power to a touch panel continually; and
    executing a function corresponding to a touched touch button upon sensing a touch event on the at least one second display device while the executed application including the input window is executed.

11. The method of claim 6, further comprising:
    displaying, by the first display device, a lock screen cancellation screen if the portable terminal is in a lock screen mode; and
    turning off a display of the touch button displayed by the at least one second display device if a sleep mode of the portable terminal is changed to an operation mode of the portable terminal.

12. The method of claim 11, further comprising:
    turning on the display of the touch button displayed by the at least one second display device if the executed application does not have an input window.

13. The method of claim 12,
    wherein the executed application including the input window further includes at least one of a voice call application, a data communication application, a text communication application, a multimedia application, and a game application, and
    wherein the executing of the application including the input window turns off operation of the LEDs of the at least one second display device regardless of the touch event on the first display device.

14. The method of claim 13,
    wherein the text communication application is an application having a letter keypad that is displayed by the first display device, and
    wherein the executing of the application including the input window turns off operation of LEDs of the at least one second display device regardless of the touch event on the letter keypad displayed by the first display device.

15. The method of claim 14,
wherein the first display device includes at least one of a Liquid Crystal Display and an Organic Light Emitting Diode (OLED), and the at least one second display device includes Light Emitting Diodes (LEDs),
wherein a number of LEDs corresponds to a number of the touch button, and
wherein a turning off the display of the touch button turns off operation of the LEDs of the at least one second display device.

16. The method of claim 15, further comprising:
supplying the power to a touch panel continually; and
executing a function corresponding to a touched touch button upon sensing a touch event on the at least one second display device while the executed application including the input window is executed.

\* \* \* \* \*